(12) United States Patent
Zisimopoulos et al.

(10) Patent No.: US 9,154,286 B2
(45) Date of Patent: *Oct. 6, 2015

(54) APPARATUS AND METHOD FOR SIGNALING IN A WIRELESS COMMUNICATION SYSTEM

(71) Applicant: SONY CORPORATION, Tokyo (JP)

(72) Inventors: Haris Zisimopoulos, Reading (GB); Chandrika Worrall, Newbury (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,548

(22) Filed: Sep. 4, 2014

(65) Prior Publication Data

US 2014/0376492 A1 Dec. 25, 2014

Related U.S. Application Data

(63) Continuation of application No. 14/051,015, filed on Oct. 10, 2013, now Pat. No. 8,917,670, which is a continuation of application No. 13/016,397, filed on Jan. 28, 2011, now Pat. No. 8,599,778, which is a continuation of application No. 11/895,625, filed on Aug. 23, 2007, now Pat. No. 8,761,091.

(30) Foreign Application Priority Data

Aug. 20, 2007 (GB) .................................. 0716210.0

(51) Int. Cl.
*H04W 4/00* (2009.01)
*H04L 5/00* (2006.01)
(Continued)

(52) U.S. Cl.
CPC .............. *H04L 5/0064* (2013.01); *H04L 47/14* (2013.01); *H04L 47/263* (2013.01); *H04W 28/12* (2013.01);
(Continued)

(58) Field of Classification Search
CPC ............. H04L 5/0064; H04W 72/042; H04W 72/1242; H04W 72/1278
See application file for complete search history.

(56) References Cited

U.S. PATENT DOCUMENTS 7,106,718 B2   9/2006   Oyama et al.
7,453,805 B2   11/2008  Velev et al.
(Continued)

FOREIGN PATENT DOCUMENTS

EP   1534040   5/2005
EP   1638235   3/2006
(Continued)

OTHER PUBLICATIONS

"3$^{rd}$ Generation Partnership Project; Technical Specification Group Services and System Aspects; GPRS Enhancements for E-URTRAN Access (Release 8)," (May 2007), 3GPP: Valbonne, France, TS 23.401v1.1.0; 1-50.
(Continued)

*Primary Examiner* — Xavier S. Wong
(74) *Attorney, Agent, or Firm* — Oblon, McClelland, Maier & Neustadt, L.L.P.

(57) ABSTRACT

A method of signaling in a wireless communication system (300) comprising a first network element (310) serving a wireless communication unit (325) with at least one packet data network (PDN) connection. The method comprises transmitting, by the first network element (310) to the wireless communication unit (325), a signaling message relating to a wireless communication unit (325) uplink (UL) PDN transmission, where the signaling message comprises a parameter indicative of at least one aggregate maximum bit rate (AMBR) value.

16 Claims, 6 Drawing Sheets

(51) Int. Cl.
*H04L 12/801* (2013.01)
*H04L 12/825* (2013.01)
*H04W 28/12* (2009.01)
*H04W 72/12* (2009.01)
*H04W 72/08* (2009.01)
*H04W 76/02* (2009.01)
*H04W 72/04* (2009.01)
*H04W 72/10* (2009.01)
*H04W 36/00* (2009.01)
*H04W 28/22* (2009.01)

(52) U.S. Cl.
CPC ........ *H04W 36/0033* (2013.01); *H04W 72/042* (2013.01); *H04W 72/08* (2013.01); *H04W 72/10* (2013.01); *H04W 72/1236* (2013.01); *H04W 72/1242* (2013.01); *H04W 76/025* (2013.01); *H04W 28/22* (2013.01); *H04W 72/1278* (2013.01)

(56) References Cited

U.S. PATENT DOCUMENTS

| | | | |
|---|---|---|---|
| 7,756,087 | B2 | 7/2010 | Kim et al. |
| 7,821,983 | B2 | 10/2010 | Wang et al. |
| 7,907,524 | B2 | 3/2011 | Willars et al. |
| 8,064,382 | B2 | 11/2011 | Zisimopoulos et al. |
| 8,085,731 | B2 | 12/2011 | Zhao et al. |
| 8,165,152 | B2 | 4/2012 | Sammour et al. |
| 8,175,074 | B2 | 5/2012 | Ludwig et al. |
| 8,259,656 | B2 | 9/2012 | Chun et al. |
| 8,295,174 | B2 | 10/2012 | Wu et al. |
| 8,433,657 | B2 | 4/2013 | Dinan |
| 8,477,724 | B2 | 7/2013 | Bakker et al. |
| 8,599,778 | B2 * | 12/2013 | Zisimopoulos et al. ..... 370/329 |
| 8,755,270 | B2 * | 6/2014 | Corbett et al. ................ 370/230 |
| 8,761,091 | B2 * | 6/2014 | Zisimopoulos et al. ...... 370/329 |
| 8,767,667 | B2 | 7/2014 | Zisimopoulos et al. |
| 8,917,670 | B2 * | 12/2014 | Zisimopoulos et al. ...... 370/328 |
| 2004/0246962 | A1 | 12/2004 | Kopeikin et al. |
| 2005/0169207 | A1 | 8/2005 | Muniere |
| 2005/0171984 | A1 | 8/2005 | Wang et al. |
| 2006/0023629 | A1 | 2/2006 | Kim et al. |
| 2006/0072503 | A1 | 4/2006 | Kim et al. |
| 2006/0285497 | A1 | 12/2006 | Miller et al. |
| 2007/0171867 | A1 | 7/2007 | Kim |
| 2008/0123660 | A1 | 5/2008 | Sammour et al. |
| 2008/0132268 | A1 | 6/2008 | Choi-Grogan et al. |
| 2008/0132269 | A1 | 6/2008 | Shen et al. |
| 2008/0310324 | A1 * | 12/2008 | Chaponniere ................. 370/254 |
| 2009/0052384 | A1 | 2/2009 | Zisimopoulous et al. |
| 2009/0086705 | A1 | 4/2009 | Zisimopoulos et al. |
| 2009/0129342 | A1 | 5/2009 | Hwang et al. |
| 2009/0168793 | A1 | 7/2009 | Fox et al. |
| 2009/0215462 | A1 | 8/2009 | Lundh et al. |
| 2009/0225719 | A1 | 9/2009 | Zhi et al. |
| 2009/0238207 | A1 | 9/2009 | Zhao et al. |
| 2009/0245108 | A1 | 10/2009 | Wu et al. |
| 2009/0252049 | A1 | 10/2009 | Ludwig et al. |
| 2009/0304015 | A1 | 12/2009 | Willars et al. |
| 2009/0310487 | A1 | 12/2009 | Eriksson |
| 2009/0316656 | A1 | 12/2009 | Zhao et al. |
| 2010/0027448 | A1 | 2/2010 | Puthiyandyil et al. |
| 2010/0035578 | A1 | 2/2010 | Ahmend |
| 2010/0046369 | A1 | 2/2010 | Zhao et al. |
| 2010/0110989 | A1 | 5/2010 | Wu et al. |
| 2010/0246533 | A1 | 9/2010 | Lundin et al. |
| 2011/0044253 | A1 | 2/2011 | Zisimopoulos |
| 2011/0075744 | A1 | 3/2011 | Laselva et al. |
| 2011/0134863 | A1 | 6/2011 | Zisimopoulous et al. |
| 2011/0170506 | A1 | 7/2011 | Zisimopoulous et al. |
| 2011/0171952 | A1 | 7/2011 | Niu |
| 2012/0008601 | A1 | 1/2012 | Zisimopoulos et al. |
| 2012/0265688 | A1 | 10/2012 | Dinan |
| 2013/0077503 | A1 | 3/2013 | Chaudhuri et al. |
| 2014/0050168 | A1 * | 2/2014 | Zisimopoulos et al. ...... 370/329 |

FOREIGN PATENT DOCUMENTS

| | | |
|---|---|---|
| EP | 1672941 | 6/2006 |
| EP | 1986455 A1 | 10/2008 |
| EP | 2104275 | 9/2009 |
| WO | WO 2005083955 | 9/2005 |
| WO | WO 2007113517 | 10/2007 |
| WO | WO 2008/128597 A1 | 10/2008 |
| WO | WO 2008/131902 A1 | 11/2008 |
| WO | WO 2008/136489 A1 | 11/2008 |
| WO | WO 2009024501 | 2/2009 |
| WO | WO 2009040260 | 4/2009 |

OTHER PUBLICATIONS

"$3^{rd}$ Generation Partnership Project; Technical Specification Group Radio Access Network; Physical Cahnnels and Modulation (Release 8)," (May 2007), 3GPP: Valbonne, France TS 36.211v1.1.0; 1-34.

Calhoun, P. et al. (Sep. 2003) "Diameter Base Protocol," RFC 3588, located at http://www.ietf.org/rfc/rfc3588.txt visited on Dec. 10, 2007, (131 pages).

Holma, H. et al. eds (2001), WCDMA for UMTS: Radio Access for Third Generation Mobile Communications. John Wiley & Sons Ltd.: West Sussex, England, 10 pages (Table of Contents).

Rigney, C. et al. (Jun. 2000), "Remote Authentication Dial in User Service, "RFC 2865, located at http://www.ietf.org/rfc/rfc2865/.txt visited on Dec. 10, 2007, (68 pages).

International Search Report, dated Jan. 13, 2009 from PCT/EP2008/060556.

Combined Search and Examination Report Under Sections 17 and 18(3) dated Dec. 19, 2007 from British Application No. GB0716210.0.

European Search Report issued Oct. 12, 2011 in European Application No. 10169182.2-2412/2237604, 8 pages.

3GPP TS 36.300V1.0.0; $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); (Mar. 2007), pp. 1-82.

3GPP TSG-RAN2 Meeting #57bis, Tdoc R2-071176, "Handling of AMBR", Document for: Discussion and decision, St. Julian, Malta, Mar. 26-30, 2007, 2 pages.

3GPP TS 23.401; $3^{rd}$ Generation Partnership Project; Technical Specification Group Services and System Aspects; GPRS enhancements for E-UTRAN access (Release 8), V1.1.0 (Jul. 2007); pp. 1-78.

XP-002508151, 3GPP TR 23.882; $3^{rd}$ Generation Partnership Project; Technical Specification Group Services and System Aspects; 3GPP System Architecture Evolution; Report on Technical Options and Conclusions (Release 7) V1.11.0 (Jul. 2007), pp. 1-211.

European Search Report issued Apr. 26, 2013 in European Patent Application No. 13159288.3-1854, 9 pages.

Huawei, Vodafone; "Usage of AMBR in EPS", 3GPP TSG SA WG2 Architecture—S2#58, S2-073001; Jun. 25-29, 2007; Orlando, FL, USA, 3 pages.

Samsung, Nokia, Siemens Networks; "Handling of AMBR" 3GPP TSG-RAN2 Meeting #57, Tdoc R2-070621, Feb. 12-16, 2007, St. Louis, USA, 2 pages.

Nokia; "Handling of Maximum Bit Rates in the SAE Bearer Model"; 3 GPP TSG SA WG2 Architecture—SA2#55; S2-063608, Oct. 23-27, 2006, Busan, Korea, 3 pages.

Office Action issued Mar. 4, 2014 in Japanese Patent Application No. 2013-194063 (with English Translation).

$3^{rd}$ Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3Gpp TS 36.300 (Jun. 2007), V8.1.0, (pp. 1-106).

$3^{rd}$ Generation Partnership Project; Technical Specification Group Services and System Aspects; 3GPP System Architecture Evolution:

(56) References Cited

OTHER PUBLICATIONS

Report on Technical Option and Conclusions (Release 7), 3GPP TR 23.822, (Jul. 2007), V1.11.0, (pp. 1-80; partial).
Nokia, Handling of Maximus Bit Rates in the SAE Bearer Model, 3GPP TSG SA WG2 Architecture—SA2#55 S2-063608, Oct. 23, 2006, (pp. 1-3).
$3^{rd}$ Generation Partnership Project; Technical Specification Group Services and System Aspects; GPRS enhancements for E-UTRAN access (Release 8), 3GPP TS 23.401 (Jul. 2007), V1.1.0 (pp. 1-77).
Office Action issued Apr. 10, 2014 in Chinese Patent Application No. 200880107632.0 (with English Translation).
$3^{rd}$ Generation Partnership Project; Technical Specification Group Services and System Aspects; GPRS enhancements for E-UTRAN access (Release 8), 3 GPP TS 23.401 (Jul. 2007), V1.1.0, (4 pages).
Korean Office Action issued Jun. 23, 2014, in Korean Patent Application No. 10-2010-7005312 (with English translation).
U.S. Appl. No. 14/518,758, filed Oct. 20, 2014, Zisimopoulos, et al.

\* cited by examiner

FIG. 1 - Prior Art
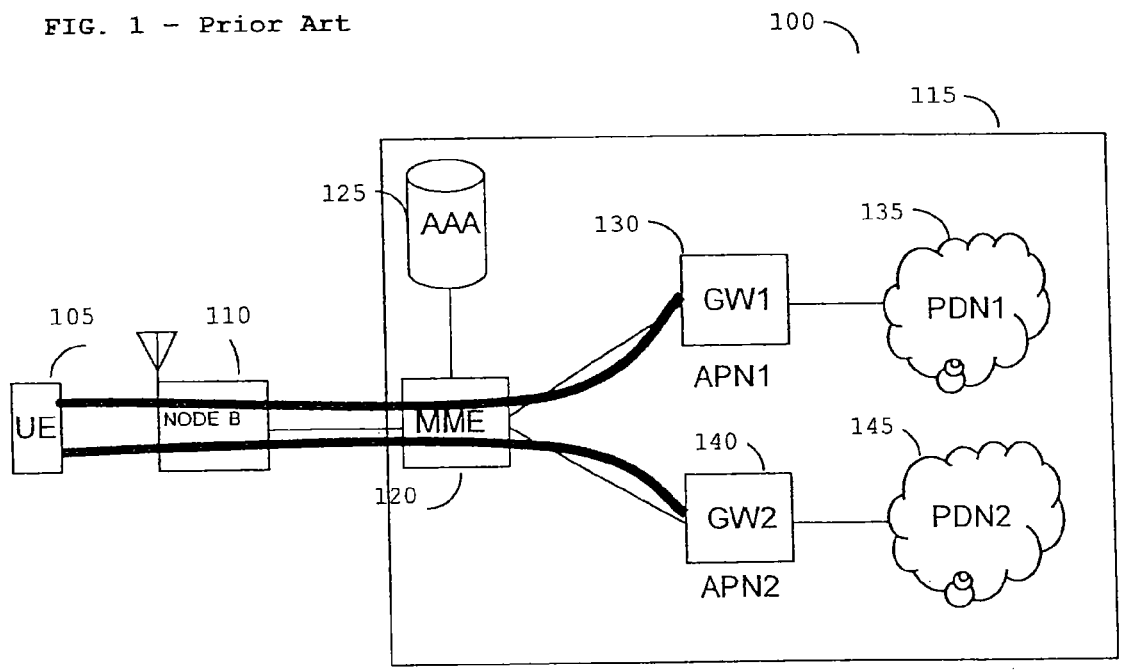
FIG. 2 - Prior Art
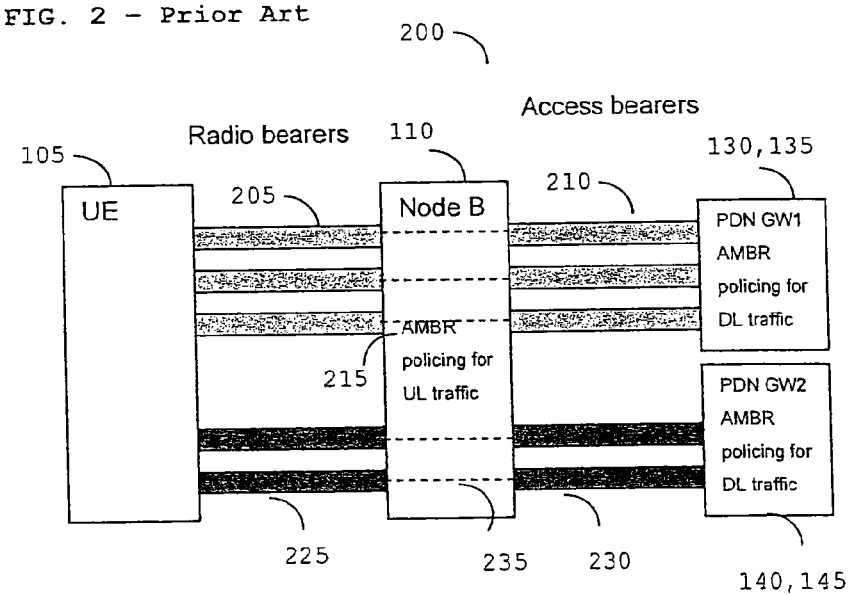

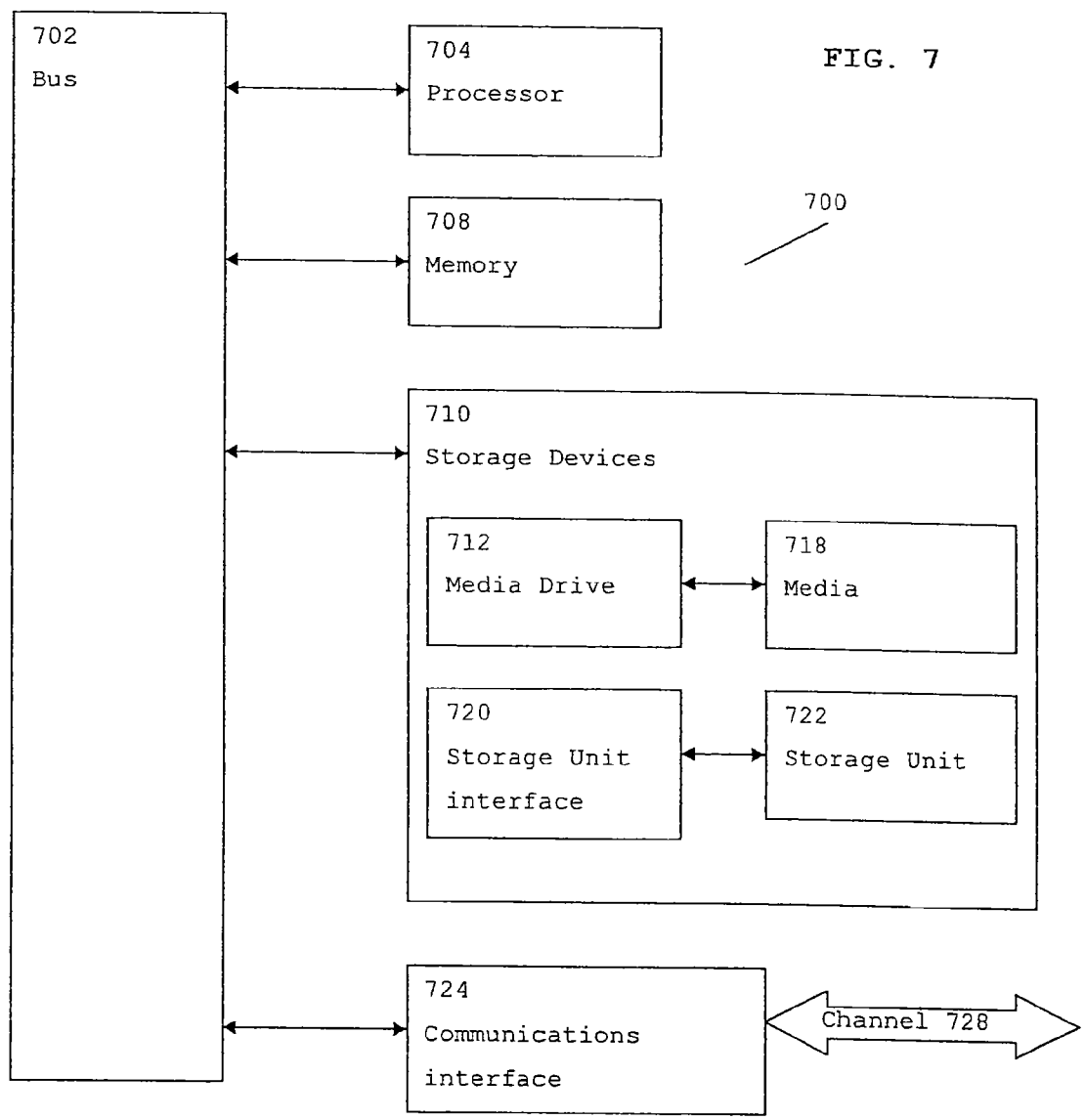

APPARATUS AND METHOD FOR SIGNALING IN A WIRELESS COMMUNICATION SYSTEM

CROSS-REFERENCE TO RELATED APPLICATIONS

This application is a continuation of and is based upon and claims the benefit of priority under 35 U.S.C. §120 for U.S. Ser. No. 14/051,015, filed Oct. 10, 2013 which is a continuation of U.S. Ser. No. 13/016,397, filed Jan. 28, 2011 (now U.S. Pat. No. 8,599,778), which is a continuation application of U.S. Ser. No. 11/895,625, filed Aug. 23, 2007 (now U.S. Pat. No. 8,761,091), and which claims the benefit of priority under 35 U.S.C. §119 from United Kingdom Patent Application No. GB0716210.0, filed Aug. 20, 2007 the entire contents of each of which are incorporated herein by reference.

BACKGROUND OF THE INVENTION

1. Field of the Invention

The invention relates to apparatus and methods for signaling communications in a packet data network, such as a $3^{rd}$ Generation Partnership Project (3GPP) cellular communication system.

2. Background of the Invention

Currently, $3^{rd}$ generation cellular communication systems are being rolled out to further enhance the communication services provided to mobile phone users. The most widely adopted $3^{rd}$ generation communication systems are based on Code Division Multiple Access (CDMA) and Frequency Division Duplex (FDD) or Time Division Duplex (TDD) technology. Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In 3GPP systems, such as the General Packet Radio System (GPRS), Evolved Packet System (EPS), the downlink communication endpoint, namely the mobile or handheld wireless communication unit, referred to as user equipment (UE) in 3G parlance, may have multiple simultaneous connections to a number of network elements. Such network elements typically comprise gateways (GWs), such as General GPRS Support nodes (GGSNs), packet data network (PDN) GWs, etc., in order to obtain access to different Packet Data Networks (PDNs) that facilitate the UE accessing a number of different services (for example facilitating access to corporate services as well as simultaneous access to the Internet).

In such systems, the amount of data being transferred between elements may be controlled by setting an aggregate maximum bit rate (AMBR), which is defined as an upper limit for non-guaranteed bit rate (GBR) communication bearers that are associated with a particular PDN connection that a UE has established.

FIG. 1 illustrates a known 3GPP system 100 that uses AMBR. The 3GPP system 100 comprises a UE 105 communicating with two independent PDNs, PDN-1 135 and PDN-2 145 via first and second access point nodes 130, 140 respectively, which are shown as GWs. The respective data streams to the PDNs are routed by a Mobility Management Entity (MME) 120, which is coupled to Authentication, Authorization and Accounting (AAA) Server 125. The totality of these network elements is often referred to as a core network 115. A Node-B 110 routes the wireless transmission from the UE 105 to the MME 120 in the core network 115. In order to utilize an AMBR to limit a data amount sent to the respective PDNs, the AMBR needs to be enforced for each of the Non-Guaranteed Bit Rate (GBR) bearers connecting the UE with a particular GW providing access to a specific PDN.

In 3GPP (see, for example, 3GPP TS 23.401, 'GPRS enhancements for E-UTRAN access'; Release 8) the AMBR is enforced in the NodeB 110 in 3GPP for the UpLink (UL) traffic and in the GW (for example PDN-1 and PDN-2 GWs in 3GPP) for the respective DownLink (DL) traffic. This is a natural choice given that the NodeB and GWs are the traffic ingress points for the UL and DL traffic respectively. Furthermore, as radio resources are the most cost sensitive for a wireless Operator, it is not reasonable to 'pass through' UL traffic over an air-interface when the UL traffic will be later discarded. Thus, the Node B 110 has to be informed of the PDN connections that the UE 105 has established at any time and be in a position to associate the radio bearer that it assigns scheduling priorities with the UE-PDN connection that it belongs to. In other words the Node B 110 has to take into account the AMBR value and its relationship with each UE-PDN connection to the UL scheduling decisions it makes (for example by assignment of a prioritized bit rate PBR). The Node-B 110 also controls the radio bearer establishment and management. According to the information received from the relevant Core Network (CN) 115 element, for example MME 120 in the 3GPP Evolved Packet System (EPS), the Node B 110 establishes the radio bearers for all the corresponding gateways (GW).

The characteristics of AMBR are somewhat different to other dynamic bearer parameters that are used in wireless and other communication systems to support a particular end-to-end QoS, in the sense that:

(i) An AMBR value is applied to a 'bundle' of Non-GBR bearers, for a specific UE-PDN connection, and not each one individually. Therefore, AMBR values require a special treatment by the network element that is responsible to enforce and police the AMBR, particularly when this element is responsible to schedule resources that are dynamically changing (such as the Node-B); and (ii) The AMBR value is static subscriber information, stored in the subscriber database registry. Therefore, the AMBR value has to be communicated during the initial attach procedure, instead of being dynamically provided by the Policy Server as part of the bearer setup, in contrast to how the other dynamically changing QoS parameters are normally provided.

FIG. 2 illustrates a known radio bearer establishment mechanism between the UE 105 and the Node-B 110, and the AMBR policing performed in the UL and DL respectively. It is noteworthy that a one-to-one relationship between the radio bearer 205 that connects the UE 105 to the Node-B 110 and access bearer 210 that terminates the traffic to the PDN GW 130 is maintained at the radio bearer 205 establishment. At a given time, there may be more than one radio bearer 205 and access bearer 210 established to the UE 105 for the purposes of providing different Quality of Service (QoS) treatment to different user applications or classes of users. In the DL, the logical elements of the scheduler in the Node-B 110 schedules the DL traffic based on a particular Quality of Service (QoS) of the radio bearers 205 that has been indicated to it by some QoS identifier during the bearer establishment as well as traffic volume used in the respective radio bearers 205. The AMBR policing for the DL traffic is carried out at the respective PDN GW 130, 135, 140, 145, given this is where the 3GPP Policy and Charging Enforcement Function (PCEF) is typically located since the PDN GWs 130, 140 are the first ingress points of downlink (DL) traffic.

If an AMBR level is exceeded in the DL, for a particular PDN connection, the exceeding traffic for all the access (non-
}

GBR) bearers 210 from this PDN GW may be rate limited by the 3GPP PCEF in the PDN GW, in order to conform to the specified AMBR that has been communicated to the PDN GW at the initial bearer establishment.

Thus, UL resource is assigned by the appropriate logical element of the scheduler in the Node-B 110 according to the traffic volume reported by the UE, and allocated on a per UE basis. The scheduling of radio bearers 205 into the allocated grant is performed by the UE 105 using the logical function of the UL packet scheduler based on priorities that are communicated to it at the radio bearer establishment by the Node-B 110. In order to control the radio bearer scheduling by the UE 105, an UL rate control function that manages the sharing of UL resources between radio bearers has been specified in 3GPP. The scheduler in the Node-B 110 configures each radio bearer 205 with scheduling parameters, such as an absolute priority value and a Prioritized Bit Rate (PBR) value, based on the Quality of Service (QoS) parameters that are communicated by the core network (CN), such as the QoS label and the GBR value for the GBR bearers. In addition, a maximum bit rate (MBR) may be optionally configured per radio bearer 205. The assigned priority value and the PBR are signaled to the UE 105 together with the radio bearer configuration information. The priority value is decided by the Node-B 110 based on the QoS information received from the Core Network (CN) 115. In this manner, the PBR sets an UL rate control limit at the UE that applies per radio bearer and ensures that the UE 105 serves its radio bearers 205 in decreasing priority order up to their PBR value.

If any resources remain available, all the radio bearers 205 are served in a strictly decreasing priority order, up to their MBR (if configured). In a case where no MBR is configured, the radio bearer 205 is served until either the data for that radio bearer 205 or the UL grant is exhausted, whichever occurs first. In general terms these parameters are the scheduling priority parameters that apply in the case of a 3GPP long-term evolution (LTE) wireless communication system.

However, the inventors have recognized and appreciated that the assignment of these scheduling parameters (for example PBR, priority and (optionally) MBR in a case of a 3GPP LTE wireless communication system) are not associated with the AMBR that applies to the entire UE-PDN connection that this radio bearer serves. This means, in effect, that if two bearers have the same QoS characteristics (for example, QoS label) and even though they belong to two different PDN connections (for example one with high AMBR values and one with low AMBR values), both radio bearers will receive the same scheduling treatment given that the AMBR is not communicated to the Node-B. Thus, this scenario is inefficient and wasteful of valuable resource. For example, if a bearer serves hyper text transfer protocol (HTTP) traffic from a virtual private network (VPN) with high AMBR and HTTP traffic from the Internet with a low AMBR, the same scheduling treatment at the Node-B 110 and the UE 105 will apply to both.

Consequently, current techniques are suboptimal. Hence, an improved mechanism to address the problem of handling AMBR over a cellular network would be advantageous.

SUMMARY OF THE INVENTION

Accordingly, the invention seeks to mitigate, alleviate or eliminate one or more of the above-mentioned disadvantages singly or in any combination.

According to a first aspect of the invention, there is provided, a method of signaling in a wireless communication system comprising a first network element serving a wireless communication unit with at least one packet data network (PDN) connection. The method comprises transmitting, by the first network element to the wireless communication unit, a signaling message relating to a wireless communication unit uplink (UL) PDN transmission. The signaling message comprises a parameter indicative of at least one aggregate maximum bit rate (AMBR) value.

In this manner, a mechanism to police the AMBR value in the Node-B without wasting unnecessarily uplink resource is provided by modifying, for example, the scheduler function in the Node-B to assign scheduling parameters relevant to the value of the UL AMBR that has to be enforced for radio bearers serving on UE-PDN connection.

Thus, embodiments of the invention may allow improved use of the communication resource by more efficiently utilizing uplink resources in the communication system, for example, as a result of not admitting by the Node-B uplink (UL) traffic transmitted by the UE that may have to be dropped later if it exceeded the AMBR value. Consequently, the invention may provide increased throughput rates and increase the capacity in the communication system by not admitting traffic that may have to be subsequently dropped. Furthermore, the invention may allow improved performance, as perceived by the end-users, and also may allow the network operator to increase a number of users that can be supported by the system, whilst still being able to control the UL AMBR that is transmitted by the UEs to a certain PDN connection.

According to an optional feature of the invention, the aforementioned transmitting comprises transmitting as part of an establishment of the at least one PDN connection. In this manner, the signaling message may be implemented within existing messages to establish at least one PDN connection.

According to an optional feature of the invention, the signaling message comprises at least one AMBR value. In this manner, no association of a parameter needs to be generated by the network element may be avoided, with the AMBR value provided directly.

According, to an optional feature of the invention, the signaling message comprises a parameter associated with the at least one AMBR value. In this manner, existing signaled parameters may be modified to reflect (be associated with) the at least one AMBR value.

According to an optional feature of the invention, the method further comprises associating, by the first network element, a received data packet from the wireless communication unit with a user transmission priority level associated with the at least one PDN connection based on the at least one AMBR value. In this manner, an user transmission priority level may be associated with the at least one PDN connection to reflect (be associated with) the at least one AMBR value.

According to an optional feature of the invention, at least one PDN identifier per PDN connection may be associated based on the at least one AMBR value.

According to an optional feature of the invention, the method further comprises deriving, by the first network element, a maximum bit rate (MBR) value per PDN connection of the wireless communication unit to the first network element based on the at least one AMBR level.

According to an optional feature of the invention, the wireless communication system further comprises a first network element operably coupled to a second network element over a PDN connection. The method further comprises transmitting, by the second network element to the first network element, the signaling message relating to the wireless communication unit UL PDN transmission. In this manner, an element in the core network, for example a mobility management entity (MME), may be configured to access and communicate the AMBR value, for example via a user profile of the wireless communication unit that comprises at least one AMBR value per PDN connection.

According to an optional feature of the invention, the method further comprises identifying, by the first network element, when an allocation of a user transmission priority value exceeds the AMBR value applied to the at least one PDN connection.

According to an optional feature of the invention, the method further comprises re-allocating, by the first network element, at least one user transmission priority value associated with the at least one PDN connection when the AMBR value is exceeded.

According to an optional feature of the invention, the aforementioned step of transmitting comprises transmitting as part of an attach procedure to establish the at least one PDN connection of the wireless communication unit to the first network element. In this manner, the signaling message may be implemented within existing messages to establish at least one PDN connection.

In one optional embodiment, the at least one PDN connection of the wireless communication unit comprises a plurality of PDN connections that the wireless communication unit has access to, for example the attach procedure may establish a plurality of PDN connections that the wireless communication unit has access to.

In one optional embodiment, the method may be applied to a $3^{rd}$ Generation Partnership Project (3GPP) cellular communication system. In one optional embodiment, the method may be applied to a 3GPP Evolved Packet System (EPS) architecture.

In one optional embodiment, the method may be applied to a WiMAX cellular communication system.

According to a second aspect of the invention, there is provided a wireless communication unit adapted to perform the wireless communication unit operations hereinbefore described.

According to a third aspect of the invention, there is provided a network element adapted to perform the network element operations hereinbefore described.

According to a fourth aspect of the invention, there is provided a network element arranged to provide signaling in a wireless communication system to a wireless communication unit over at least one packet data network (PDN) connection. The network element comprises logic for transmitting a signaling message relating to a wireless communication unit uplink (UL) PDN transmission to the wireless communication unit wherein the signaling message comprises a parameter indicative of at least one aggregate maximum bit rate (AMBR) value.

According to a fifth aspect of the invention, there is provided a wireless communication unit arranged to receive a signaling message in a wireless communication system from a network element over at least one packet data network (PDN) connection. The wireless communication unit comprises logic for receiving a signaling message relating to an uplink (UL) PDN transmission of the wireless communication unit wherein the signaling message comprises a parameter indicative of at least one aggregate maximum bit rate (AMBR) value.

According to a sixth aspect of the invention, there is provided a method of signaling in a wireless communication system comprising a first network element serving a wireless communication unit with at least one packet data network (PDN) connection. The method comprises receiving, by the wireless communication unit from a first network element, a signaling message relating to an uplink (UL) PDN transmission from the wireless communication unit wherein the signaling message comprises a parameter indicative of at least one aggregate maximum bit rate (AMBR) value.

According to a seventh aspect of the invention, there is provided a computer program product comprising program code for signaling in a wireless communication system from a network element to a wireless communication unit over at least one packet data network (PDN) connection. The computer program product comprises program code for transmitting a signaling message relating to a wireless communication unit uplink (UL) PDN transmission to the wireless communication unit, wherein the signaling message comprises a parameter indicative of at least one aggregate maximum bit rate (AMBR) value.

These and other aspects, features and advantages of the invention will be apparent from, and elucidated with reference to, the embodiments described hereinafter.

BRIEF DESCRIPTION OF THE DRAWINGS

FIG. 1 illustrates a known 3GPP system using AMBR.

FIG. 2 illustrates a known AMBR policing, taking place in the Node B for the UL and GW for the DL traffic.

Figure 3:
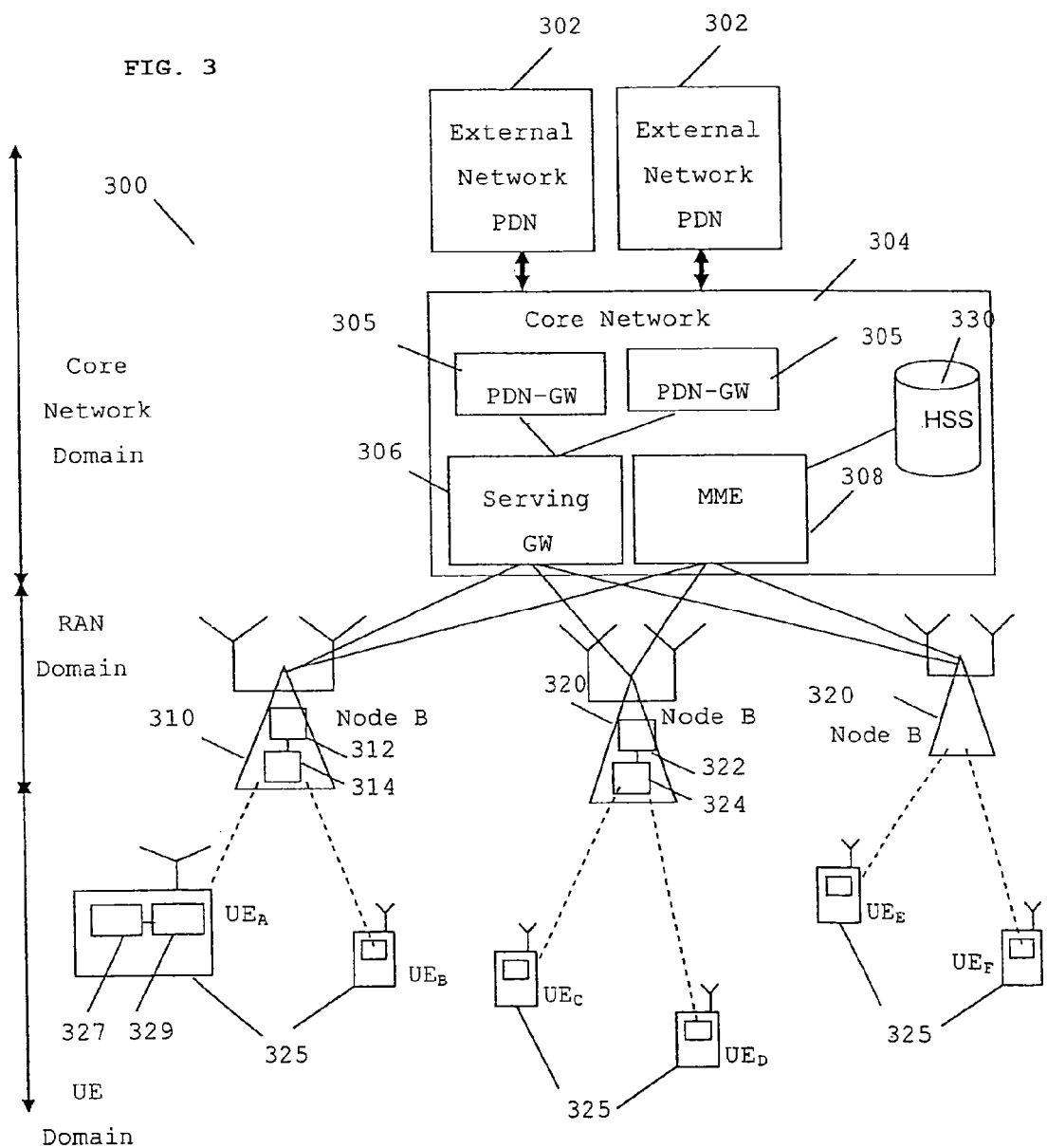

Embodiments of the invention will be described, by way of example only, with reference to the accompanying drawings, in which:

FIG. 3 illustrates a system architecture adapted in accordance with some embodiments.

Figure 4:
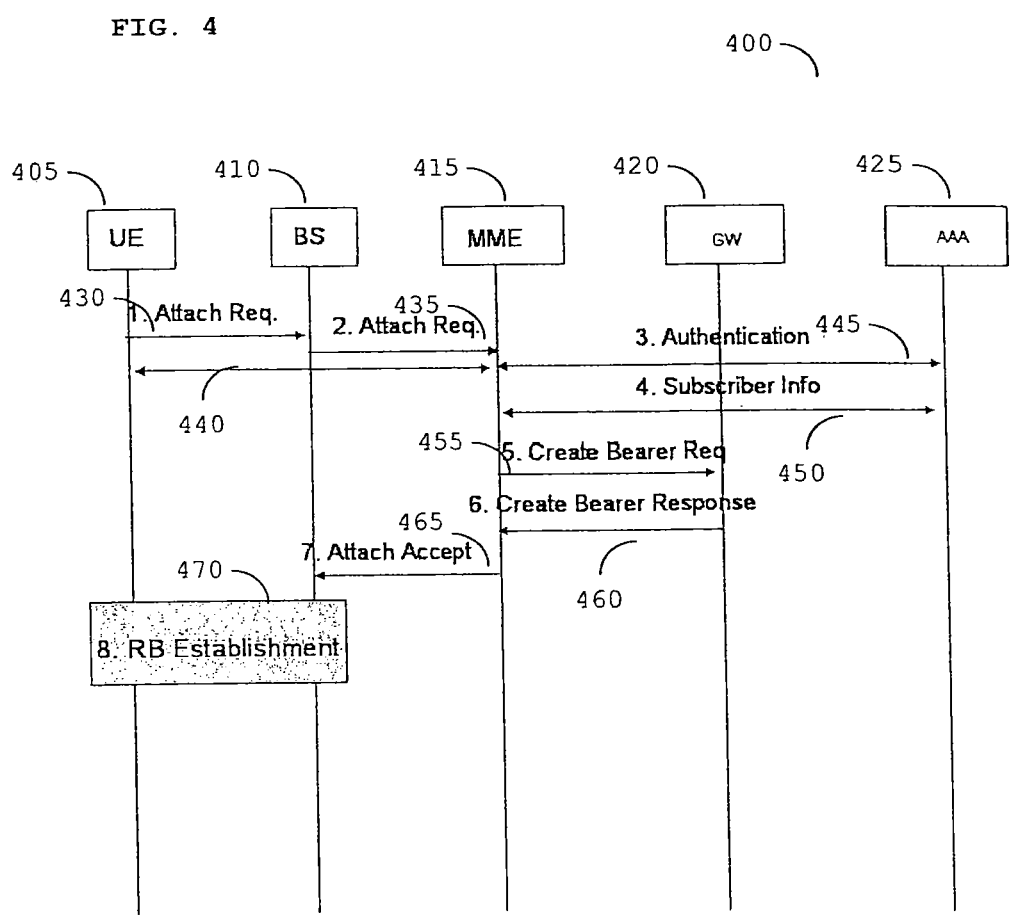

FIG. 4 illustrates an attach procedure and bearer establishment in accordance with some embodiments.

Figure 5:
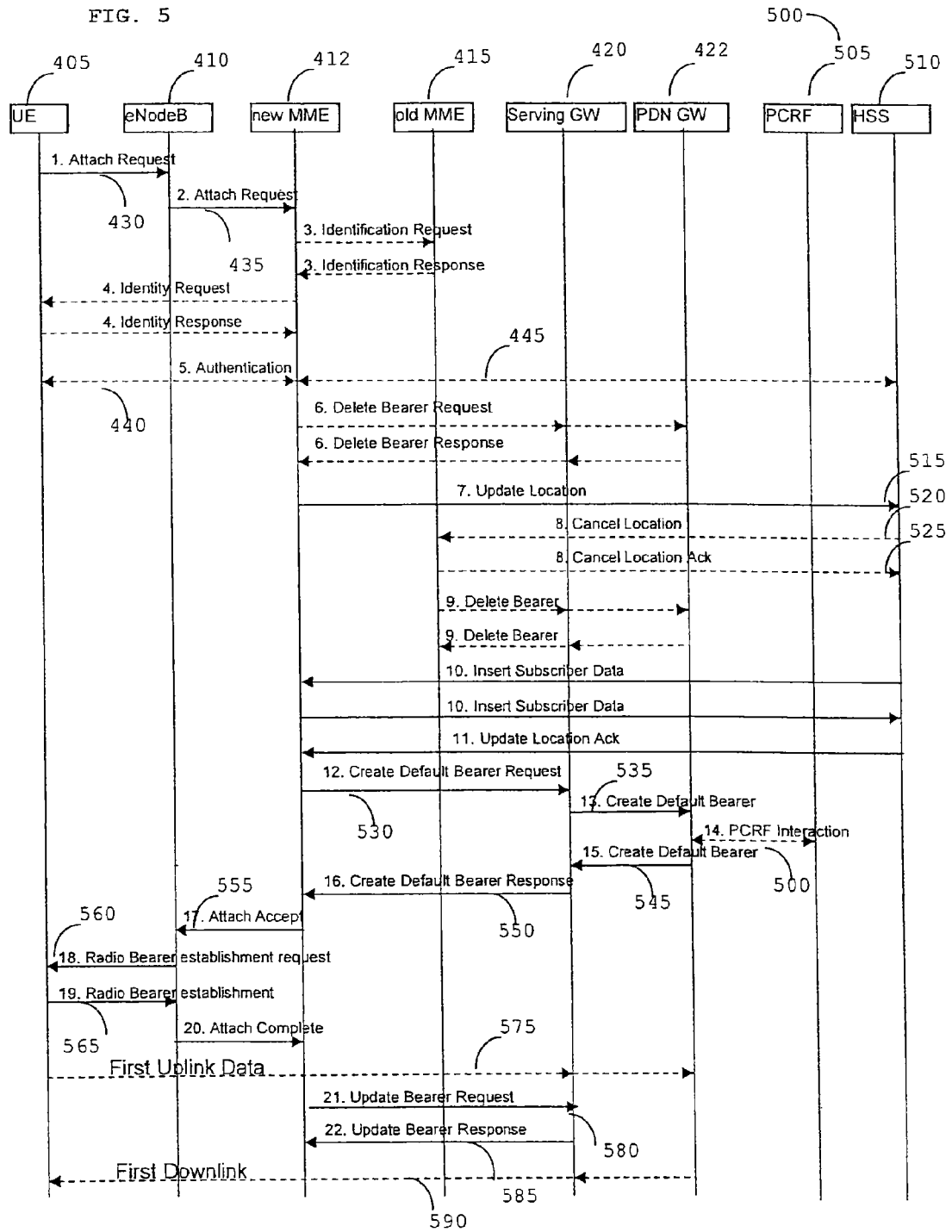

FIG. 5 illustrates an attach procedure and bearer establishment of an EPS/LTE system in accordance with some embodiments.

Figure 6:
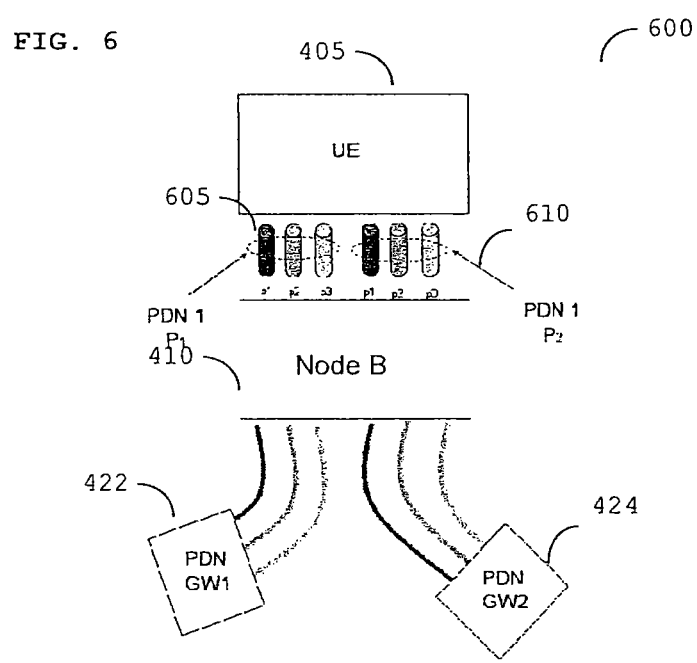

FIG. 6 illustrates a scheduling mechanism for the group of bearers corresponding to the same UE-PDN connection in accordance with some embodiments.

FIG. 7 illustrates a typical computing system that may be employed to implement processing functionality in embodiments of the invention.

DETAILED DESCRIPTION OF EMBODIMENTS OF THE INVENTION

The following description focuses on embodiments of the invention applicable to a Evolved-UMTS (Universal Mobile Telecommunication System) cellular communication system and in particular to a Evolved Packet System (EPS) core network (CN) architecture within a $3^{rd}$ generation partnership project (3GPP) system. However, it will be appreciated that the invention is not limited to this particular cellular communication system, but may be applied to other cellular communication systems.

Embodiments of the invention propose to obtain the AMBR parameter with its associated PDN connection identifier from a static subscriber database when the communication endpoint bootstraps and attaches initially in the network. Furthermore, and advantageously, the AMBR is communicated with its associated PDN connection identifier to the network element that is responsible to police and enforce the AMBR per PDN connection.

In addition, some embodiments propose a network element enforcing the AMBR for a plurality of PDN connections that the communication endpoint, for example a UE, may have in place. Thus, the network element is configured to be responsible to serve multiple communication endpoints in an environment of dynamically changing resources.

Referring now to FIG. 3, a wireless communication system 300 is shown in outline, in accordance with one embodiment of the invention. In this embodiment, the wireless communication system 300 is compliant with, and contains network elements capable of operating over, a universal mobile telecommunication system (UMTS) air-interface. In particular, the embodiment relates to a system's architecture for an Evolved-UTRAN (E-UTRAN) wireless communication system, which is currently under discussion in 3GPP. This is also referred to as Long Term Evolution (LTE).

The architecture consists of radio access network (RAN) and core network (CN) elements, with the core network 304 being coupled to external networks 302 named Packet Data Networks (PDNs), such as the Internet or a corporate network. The main component of the RAN is an eNodeB (an evolved NodeB) 310, 320, which is connected to the CN 304 via S1 interface and to the UEs 320 via an Uu interface. The eNodeB 310, 320 controls and manages the radio resource related functions. The series of Node Bs 310, 320 typically perform lower layer processing for the network, performing such functions as Medium Access Control (MAC), formatting blocks of data for transmission and physically transmitting transport blocks to UEs 325. In addition to these functions that the NodeB's usually perform, the adapted Node Bs 310 scheduler logical element is additionally arranged to interact with the logical element of the PEF that is assigned to enforce the UL AMBR for non-GBR bearers that belong to a certain UE-PDN connection, in order to provide a sub-set of functions that the 3GPP PCEF located in the PDN GW 305 implements in the downlink (DL) such rate limiting. An additional limitation exists in that the rate limiting function of a PEF logical element in the UL has to meet a certain performance, and that it cannot simply 'pass-through' the traffic over-the-air and then drop it. Hence, the adapted schedulers in the Node Bs 310 are arranged to derive adequate scheduling parameters that will be communicated to the UE 320 based on the AMBR that has to be enforced by the logical element of a Policy Enforcement Function (PEF) located in the Node-B 310, in order to support this operation.

The CN 304 has three main components: serving GW 306, the PDN GW (PGW) 305 and mobility management entity (MME) 308. The serving-GW 306 controls the U-plane (user-plane) communication. The PDN-GW 305 controls access to the appropriate external network (e.g. PDN). In addition to this operation, in one embodiment, the PDN-GW 305 is arranged to police the DL AMBR for a number of non-GBR bearers that serve this particular UE-PDN connection. The MME 308 controls the c-plane (control plane) communication, where the user mobility, paging initiation for idle mode UEs, bearer establishment, and QoS support for the default bearer are handled by the MME 308. In addition to these operations, in one embodiment, the MME 308 is arranged to derive, normally using database query mechanisms to the Home Subscriber Server (HSS) 330 with protocols such as DIAMETER (as in RFC3588) or RADIUS (as in RFC2865), the UL and DL AMBR values that apply to each PDN connection that the UE 320 is allowed to establish. The UL and DL AMBR values are based on the UE's subscription profile and provisioning information that may be stored in a static database, such as an HSS 330 that may contain the user credentials that are used for the UE's authentication, user class in terms of tier of service and other static information. The UL AMBR value is communicated to the logical element of the PEF in the Node B 310 that is assigned to enforce the UL AMBR and the DL AMBR value is communicated to the 3GPP PCEF in the PDN GW 305 that the UE 320 initially attaches to.

E-UTRAN RAN is based on OFDMA (orthogonal frequency division multiple access) in downlink (DL) and SC-FDMA (single carrier frequency division multiple access) in uplink (UL).the further information of radio frame formats and physical layer configuration used in E-UTRAN can be found in TS 36.211(3GPP TS 36.211 v.1.1.1(2007-05), '3GPP Technical specification group radio access network, physical channels and modulation (release 8)'.

The Node-Bs 310 are connected wirelessly to the UEs 325. Each Node-B contains one or more transceiver units 312, 322 operably coupled to respective signal processing logic 314, 324. Similarly, each of the UEs comprise transceiver unit 327 operably coupled to signal processing logic 329 (with one UE illustrated in such detail for clarity purposes only) and communicate with the Node B supporting communication in their respective location area. The system comprises many other UEs and Node-Bs, which for clarity purposes are not shown.

Signalling of AMBR Value

In accordance with one embodiment of the invention, the interaction between the UE 325, Node-B 310, MME 308, GW 305, 306 and AAA have been adapted to support improved usage of AMBR signaling. In particular, the AMBR value per the UE-PDN connection, together with the PDN gateway identifier from the CN to the Radio access network is communicated, to adequately communicate the available PDN connections that the UE has in place. This mechanism is described below in further detail with respect to FIG. 4.

Referring now to FIG. 4, a single signaling flow diagram is illustrated showing the two possibilities for the end-to-end bearer establishment in a wireless communication system:
 (i) UE-initiated; and
 (ii) Network-initiated It is noteworthy that this signaling exchange may include also a number of other messages and other information that are not relevant to the description of the embodiments described herein.

In step 430, the UE 325 initiates an Attach procedure by, say, sending its temporary identity (for example the UE System Architecture Evolution (SAE)-Temporary Mobile Subscriber Identity (S-TMSI) or Packet-Temporary Mobile Subscriber Identity (P-TMSI) to the Node-B 310. In a case of an UE-initiated bearer establishment, the Access Point Name (APN) will indicate, the appropriate Gateway 420 serving the PDN that the UE 325 requires to connect to.

In a case of network-initiated there is no need for the UE 325 to provide any indication as the MME 308 will establish a connection to all the PDNs that the UE 325 is allowed to access from its subscription profile.

In step 435, the Node-B 310 derives from the temporary identity of the UE 325, for example the UE S-TMSI or P-TMSI, the appropriate MME 308 that it has to forward the Attach request. In steps 440, 445 the MME 308 completes the authentication procedure with the UE 325.

In step 450, the MME 308 derives the Subscriber Info of the UE 325, which includes the information on all the PDNs the UE 325 has access to. At this stage the MME 308 will have to be able to construct a table for the UE 325, for example as illustrated in Table 1 below:

TABLE 1

| UE (imsi = xxxxxyyyyyzzzzz) | |
|---|---|
| APN1 | U1_ambr1, dl_ambr2 |
| APN2 | U1_ambr2, dl_ambr2 |
| APN3 | U1_ambr3, dl_ambr3 |

In step 455, the MME 308 creates and sends a bearer request (or requests a bearer depending on whether it is a UE-initiated establishment or a network-initiated establishment) to create connection(s) to the GW(s) 305, 306.

In a case of an UE-initiated establishment, given that the UE 325 would have indicated in step 430 the sole. GW address through the APN that it requires to connect to, the MME 308 will send the bearer request to this GW 305, 306 only. The bearer request contains the DL AMBR that the GW 305, 306 has to enforce for this connection.

In a case of network-initiated bearer establishment, the MME 308 sends bearer requests to all GWs serving the PDNs that the UE 325 has access to, as for example identified by the list of APNs it has obtained in step 450. In one embodiment, the requests contain the DL AMBRs for each APN that the relevant GWs have to enforce.

In step 460, the GW(s) 305, 306 create and send the bearer response(s). In case of UE-initiated only the selected GW 305, 306 that received the bearer request sends the response.

In step 465, the MME 308 sends the Attach Response to the Node-B 310 containing the QoS information and the value of the UL AMBR. In a case of an UE-initiated establishment, the Attach Response message will contain only the information required by the particular UE PDN connection. In a case of a network-initiated establishment, the Attach Response message contains all the information on QoS and UL AMBRs for all the APNs that the UE has access to.

In step 470, the Node-B 310 establishes the relevant radio bearer(s), subject to the information provided in step 465. In a case of an UE-initiated establishment, this leads to the establishment of only one radio bearer corresponding to this particular UE-PDN connection. In a case of a network-initiated establishment, the Node-B 310 at this stage establishes all the radio bearers to serve all the required PDN connections for the UE.

The mechanism employed by the Node-B 310 to handle the information provided in step 465, in order to determine scheduling parameters is as follows.

Referring now to FIG. 5, an enhanced embodiment is described with respect to AMBR signaling in the core network of an E-UTRAN. As defined in 3GPP TS 23.401, 'GPRS enhancements for E-UTRAN access'; Release 8, the AMBR associated with each PDN that the UE 405 has access to is stored in the home subscriber server (HSS) (equivalent to the home location register in earlier GSM-based systems) based on subscriber information. The AMBR is retrieved by the MME 415 as part of the 'Attach' procedure illustrated in step 430, 435 of FIG. 4.

As an example, the following information may be stored in the HSS for each UE, as illustrated in Table 2 below:

| UE (imsi = xxxxxyyyyyzzzzz) | |
| --- | --- |
| APN1 | Ul_ambr1, Dl_ambr2 |
| APN2 | Ul_ambr2, Dl_ambr2 |
| APN3 | Ul_ambr3, Dl_ambr3 |

This information is retrieved in the MME 415 after the UE attaches, and should be provided in the PDN GW 422 and eNodeB 410 for DL and UL policing respectively.

In this regard, the DL value of the AMBR may be sent from the MME 415 to the PDN GW 422 as part of a 'Create Default bearer message', as shown in step 550, in order for the PDN GW 422 to be able to police the AMBR in the DL. It is also envisaged, in this regard, that the UL AMBR may also be sent from the MME 415 to the eNodeB 410 as part of an 'Attach Accept' message, as illustrated in step 555.

Thus, the following additional signaling is proposed to the 'Attach' procedure of EPS/LTE as described in 3GPP TS 23.401, 'GPRS enhancements for E-UTRAN access'; Release 8, to achieve the aforementioned communications.

The HSS 510 sends an Insert Subscriber Data message (for example IMSI, Subscription Data) to the new MME 412 in step 515. The Subscription Data contains the Default APN and the UL and DL AMBR values for the APNs that the UE 405 has access to. The new MME 412 validates the UE's presence in the (new) Tracking Area/Location Area (TA/LA). If, due to regional subscription restrictions or access restrictions, the UE 405 is not allowed to attach in the TA/LA, the new MME 412 may be able to reject the Attach Request in step 435 with an appropriate cause, and may return an 'Insert Subscriber Data Ack' message 520 to the HSS 510. If subscription checking fails for other reasons, the new MME 412 may reject the Attach Request 430, 435 with an appropriate cause and returns an Insert Subscriber Data Ack message to the HSS including an error cause. If all checks are successful then the new MME 412 constructs a context for the UE 405 and returns an Insert Subscriber Data Ack message 520 to the HSS 510. The HSS may send an update location acknowledge message to the new MME 412, as shown in step 525, in accordance with the existing process described in section 5.3.2 of 3GPP TS 23.401, 'GPRS enhancements for E-UTRAN access'; Release 8.

In step 530 the new MME 412 selects a Serving GW 420 as described under 'GW Selection Function', in the aforementioned standard, and sends a Create Default Bearer Request (IMSI, MME Context ID, Default Bearer QoS, DL AMBR for the default APN) message to the selected Serving GW 420.

In step 535, the Serving GW 420 creates a new entry in its EPS Bearer table and sends a Create Default Bearer Request (Serving GW Address for the user plane, Serving GW TEID of the user plane, Serving GW TEID of the control plane, Default Bearer QoS, DL AMBR for the default APN) message to the PDN GW 422.

In step 540, the PDN GW 422 may interact with the Policy and Charging Rules Function (PCRF) 505, to obtain the default policy control and charging (PCC) rules for the UE 405, if PCRF is applied in the network. The PDN GW 422 then stores the DL AMBR for the UE 405 for the default bearer.

Subsequent messages 545 and 550 are sent in accordance with the existing process described in section 5.3.2 of 3GPP TS 23.401, 'GPRS enhancements for E-UTRAN access'; Release 8.

In step 555, the new MME 412 sends an 'Attach Accept' (including S-TMSI, PDN address, TA/LA List) message to the eNodeB 410. S-TMSI is included if the new MME allocates a new S-TMSI. This message may be contained in an S1_MME control message Initial Context Setup Request. This S1 control message may also include a security context for the UE 405 and QoS information needed to set up the radio bearer, as well as the Terminal Entity Identifier (TEID) at the Serving GW 420 used for user plane and the address of the Serving GW 420 for user plane.

The PDN address assigned to the UE 405 is included in this message. The APN of the PDN GW 422 that the UE 405 is connected to may also be included in this message. The new MME 412 sends the UL AMBR to the eNodeB 410.

In step 560, the eNodeB 410 sends a Radio Bearer Establishment Request to the UE 405 and the Attach Accept message (S-TMSI, PDN address, TA List, APN) 555 will be sent along to the UE 405.

Thereafter, messages 565-590 are sent as described in section 5.3.2 of 3GPP TS 23.401, "GPRS enhancements for E-UTRAN access"; Release 8.

AMBR Handling in the Radio Access Network, for Example the Node-B

In accordance with one embodiment of the invention, the interaction between the UE 325, Node-B 310, MME 308, GW 305, 306 and AAA have also been adapted to support improved usage of AMBR information signaled between elements. In particular, apparatus and methods are proposed to allow the radio access network (RAN) to take into account the information provided from the Core Network (CN), to be able to prioritize traffic belonging to a particular PDN connection subject to the AMBR. In an enhanced embodiment, apparatus and methods are also proposed to enforce the AMBR in the Node-B 310. The proposed mechanism configures the scheduler in the Node-B 310 to assign appropriate scheduling priority parameter values to the radio bearers (for example, PBR, priority values, MBR in 3GPP) in order to reflect the enforcement of the UL AMBR applied to the entire set of radio bearers corresponding to a UE-PDN connection that the PEF has to perform, in addition to the communicated QoS information. In addition, a mechanism is proposed to optimize the signaling between the Node B 410 and the UE 405 (reduced signaling overhead) to assign the scheduling priorities and amend them as and when necessary in order to police the AMBR that applies to the UE-PDN connection.

In a case where a UE 405 has multiple PDN connections, PEF logic in the Node-B 410 needs to police UL traffic belonging to each PDN connection separately. Therefore, the PEF logic in the Node-B 410 should have been informed of any association between the access bearers and the PDN connection during the bearer establishment.

In step 470 of FIG. 4, the simplistic case of traffic policing is where the AMBR value of a particular PDN connection is exceeded by the UL traffic, where the data may be dropped at the Node-B 410. However, the data would have already been transmitted over the air-interface. Thus, dropping the already transmitted data at the Node-B 410 would result in inefficient radio resource usage.

Although embodiments of the invention are described with reference to the MME obtaining at least one aggregate maximum bit rate (AMBR) value, and communicating this to the Node-B's PEF logic, it is envisaged that in alternative embodiments it may be possible for the Node-B PEF logic to obtain the UL AMBR value direct. In this scenario, the Node-Bs are arranged to have a direct interface to the AAA Server (or a home subscriber server (HSS) in a case of 3GPP systems) and perform the mobility management, user authentication and QoS provisioning for the default bearer functions themselves. In other words, in such a scenario, all the current functions of the MME are embodied in the Node-B.

Further, although embodiments of the invention are described with reference to the MME obtaining at least one aggregate maximum bit rate (AMBR) value and communicating this to the Node-B, with the Node-B generating an association of the AMBR with the at least one PDN Identifier, it is envisaged that in alternative embodiments it may be possible for the Node-B to obtain to transmit the AMBR value directly to the wireless communication unit (for example the UE). In this scenario, the UE will be responsible for the policing of the UL AMBR for the number of radio bearers that belong to a specific UE-PDN connection. In addition to the AMBR, in this scenario, the information of the PDN identifier may be communicated by the Node-B to the UE upon the radio bearer establishment. The inventors though recognize that this scenario has a limitation that the policing of the AMBR that is associated with the management of radio resources will be relayed solely to the UE that is traditionally considered as an 'un-trusted' entity in similar communication systems.

AMBR Handling in the NodeB Based on Assigning Absolute Priority Per PDN Connection Referring now to FIG. 6, a possible mechanism to perform scheduling in the NodeB is illustrated. The mechanism is based on the AMBR values that have been communicated as part of the bearer establishment, the Identifier (ID) for PDN GW 422 or 424 (for example APN in 3GPP) may be signaled to the UE 405 together with the assigned scheduling priority parameters (for example absolute priority value and PBR in 3GPP) during the radio bearer configuration. In addition to this signaling, an absolute priority is also signaled to apply to the group of bearers that are related to a specific PDN connection. For example, the priority that applies to each radio bearer may be defined in two steps. First, each PDN connection is provided an absolute priority value ($P_i$ 505 $P_z$ 510). Secondly, the priority of the radio bearer is assigned a relative value, relative to the absolute priority value of the PDN connection. Thus, the UE 405 may calculate the absolute priority value of the radio bearer by considering the absolute priority value of the PDN connection and the relative priority of the radio bearer.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

FIG. 7 illustrates a typical computing system 700 that may be employed to implement processing functionality in embodiments of the invention. Computing systems of this type may be used in the UE (which may be an integrated device, such as a mobile phone or a USB/PCMCIA modem), or NodeB (in particular, the scheduler of the NodeB), core network elements, such as the GGSN, and RNCs, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention.

Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of, features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:
1. An electronic device comprising:
circuitry configured to
set one or more non-Guaranteed Bit Rate bearers in association with one or more packet data network connections for uplink packet communication;
receive a parameter corresponding to an Aggregate Maximum Bit Rate, AMBR, for uplink packet transmission via the non-Guaranteed Bit Rate bearers and a priority value for each of the plurality of non-Guaranteed Bit Rate bearers; and
control the uplink packet transmission of one or more non-Guaranteed Bit Rate bearers based on the Aggregate Maximum Bit Rate and the priority values.

2. The electronic device of claim 1, wherein the circuitry is further configured to:
receive control information including a Packet Data Network (PDN) gateway identifier, wherein the gateway is a node to a packet data network.

3. The electronic device of claim 1, wherein
the parameter corresponding to the Aggregate Maximum Bit Rate is received from infrastructure equipment.

4. The electronic device of claim 1, wherein
at least one radio resource of the non-Guaranteed Bit Rate bearers is allocated based on the parameter corresponding to the Aggregate Maximum Bit Rate.

5. The electronic device of claim 1, wherein
an aggregated bit rate of uplink packet via the non-Guaranteed Bit Rate bearers is limited based on the parameter corresponding to AMBR.

6. A mobile station comprising:
an antenna unit; and
circuitry configured to
set one or more non-Guaranteed Bit Rate bearers in association with one or more packet data network connections for uplink packet communication;
receive a parameter corresponding to an Aggregate Maximum Bit Rate for uplink packet transmission via the non-Guaranteed Bit Rate bearers and a priority value for each of the plurality of non-Guaranteed Bit Rate bearers; and
control the uplink packet transmission of one or more non-Guaranteed Bit Rate bearers based on the Aggregate Maximum Bit Rate and the priority values.

7. The mobile station of claim 6, wherein the circuitry is further configured to:
receive control information including a Packet Data Network (PDN) gateway identifier, wherein the gateway is a node to a packet data network (PDN).

8. The mobile station of claim 6, wherein
the parameter corresponding to the Aggregate Maximum Bit Rate is received from infrastructure equipment.

9. The mobile station of claim 6, wherein
at least one radio resource of the non-Guaranteed Bit Rate bearers is allocated based on the parameter corresponding to the Aggregate Maximum Bit Rate.

10. The mobile station of claim 6, wherein
An aggregated bit rate of uplink packet via the non-Guaranteed Bit Rate bearers is limited based on the parameter corresponding to AMBR.

11. A communication method comprising:
setting one or more non-Guaranteed Bit Rate bearers in association with one or more packet data network connections for uplink packet communication;
receiving a parameter corresponding to an Aggregate Maximum Bit Rate for uplink packet transmission via the non-Guaranteed Bit Rate bearers and a priority value for each of the plurality of non-Guaranteed Bit Rate bearers; and
controlling, by circuitry, the uplink packet transmission of one or more non-Guaranteed Bit Rate bearers based on the Aggregate Maximum Bit Rate and the priority values.

12. The method of claim 11, further comprising:
receiving control information including a Packet Data Network (PDN) gateway identifier, wherein the gateway is a node to a packet data network (PDN).

13. The method of claim 11, wherein
the parameter corresponding to the Aggregate Maximum Bit Rate is received from infrastructure equipment.

14. The method of claim 11, wherein
at least one radio resource of the non-Guaranteed Bit Rate bearers is allocated based on the parameter corresponding to the Aggregate Maximum Bit Rate.

15. The method of claim 11, wherein
an aggregated bit rate of uplink packet via the non-Guaranteed Bit Rate bearers is limited based on the parameter corresponding to AMBR.

16. An electronic device comprising:
means for setting one or more non-Guaranteed Bit Rate bearers in association with one or more packet data network connections for uplink packet communication;
means for receiving a parameter corresponding to an Aggregate Maximum Bit Rate for uplink packet transmission via the non-Guaranteed Bit Rate bearers and a priority value for each of the plurality of non-Guaranteed Bit Rate bearers; and
means for controlling the uplink packet transmission of one or more non-Guaranteed Bit Rate bearers based on the Aggregate Maximum Bit Rate and the priority values.

* * * * *